United States Patent
Marabese (10) Patent No.: US 8,286,978 B2
(45) Date of Patent: Oct. 16, 2012

(54) SYSTEM TO CONTROL THE TRIM OF MOTORCYCLES WITH THREE OR FOUR WHEELS

(75) Inventor: Luciano Marabese, Sesto Calende (IT)

(73) Assignee: Quadro Tecnologie S.R.L., Cerro Maggiore (MI) (IT)

( * ) Notice: Subject to any disclaimer, the term of this patent is extended or adjusted under 35 U.S.C. 154(b) by 261 days.

(21) Appl. No.: 12/301,020

(22) PCT Filed: Jul. 28, 2006

(86) PCT No.: PCT/EP2006/064794
§ 371 (c)(1),
(2), (4) Date: Nov. 14, 2008

(87) PCT Pub. No.: WO2008/011917
PCT Pub. Date: Jan. 31, 2008

(65) Prior Publication Data
US 2009/0121448 A1 May 14, 2009

(51) Int. Cl.
B60G 11/27 (2006.01)
B60G 11/26 (2006.01)
B60G 11/30 (2006.01)
B60G 17/04 (2006.01)
B62D 9/02 (2006.01)

(52) U.S. Cl. ... 280/124.112; 280/124.157; 280/124.158; 280/124.161; 280/124.103; 280/124.159; 280/124.16; 280/5.509

(58) Field of Classification Search ........... 280/124.103, 280/124.112, 124.157, 124.158, 124.161, 280/5.509, 6.154, 124.159, 124.16; 180/210
See application file for complete search history.

(56) References Cited

U.S. PATENT DOCUMENTS

| | | | | | |
|---|---|---|---|---|---|
| 3,112,923 | A | * | 12/1963 | Ley | 267/186 |
| 3,357,512 | A | * | 12/1967 | Wilson | 180/359 |
| 4,478,431 | A | * | 10/1984 | Muller et al. | 280/6.159 |
| 4,798,398 | A | * | 1/1989 | Cummins | 280/124.159 |
| 5,219,152 | A | * | 6/1993 | Derrien et al. | 267/64.15 |

(Continued)

FOREIGN PATENT DOCUMENTS
DE 94 14 724 U1 11/1994

(Continued)

*Primary Examiner* — Paul N Dickson
*Assistant Examiner* — Joselynn Y Sliteris
(74) *Attorney, Agent, or Firm* — Sampson & Associates, P.C.

(57) ABSTRACT

System to control the trim of motorcycles with three or four wheels, the motorcycle having two couples of front and rear wheels, or one front wheel and a couple of rear wheels, or a couple of front wheels and one rear wheel. The system to control the trim comprises, at one or both couples of wheels, a hydraulic system configured to link hydraulically at least one couple of wheels, comprising two hydraulic cylinders interconnected at one of the ends through a first pipe, in each of the cylinders a piston sliding by means of a connecting rod, each piston dividing a chamber of the respective cylinder in two parts, not communicating with each other, in a first part of each cylinder communicating with the first pipe being present a liquid able to flow therebetween through the first pipe, and a second closed part of each cylinder having a gas under pressure therein, the cylinders and connecting rods being bound to a chassis or to a hub by fastening, and wherein the system is configured to control the trim by an increase of leaning angle being resisted by an increase of the pressure of the gas present in the second closed part of one of the cylinders.

4 Claims, 7 Drawing Sheets

U.S. PATENT DOCUMENTS 6,263,994 B1    7/2001    Eitel

FOREIGN PATENT DOCUMENTS

| | | |
|---|---|---|
| EP | 1 362 779 A | 11/2003 |
| EP | 1 520 775 A1 | 4/2005 |
| JP | A-S62-31574 | 2/1987 |
| WO | WO 97/27071 A | 7/1997 |
| WO | WO 99/61302 | 12/1999 |
| WO | WO 02/44008 A | 6/2002 |
| WO | WO-2009087595 A * | 7/2009 |

* cited by examiner

SYSTEM TO CONTROL THE TRIM OF MOTORCYCLES WITH THREE OR FOUR WHEELS

FIELD OF THE INVENTION

The present invention relates to motorcycle type vehicles with three or four wheels, and more in detail to a system to control the trim of motorcycle type vehicles with three or four wheels.

DESCRIPTION OF THE PRIOR ART

Figure 1:
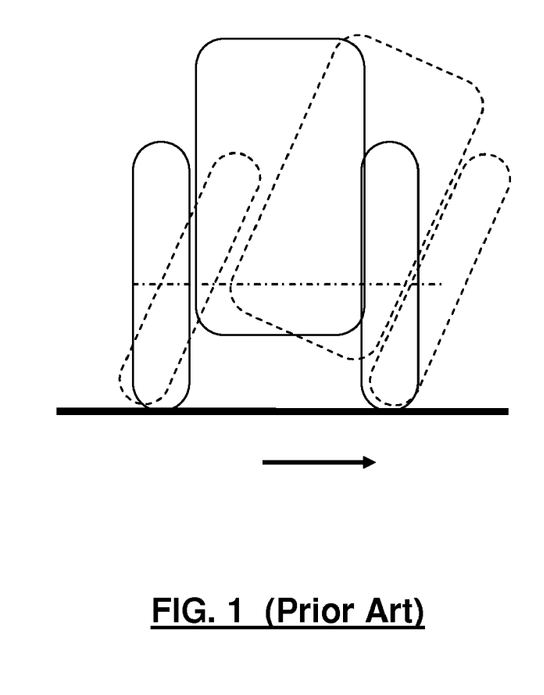
FIGS. 1 and 2 show sketches of a motorcycle silhouette in front view with the system to control the trim of known type.

The present invention relates to motorcycle type vehicles with three or four wheels (at least two of those coupled) of the kind which can lean laterally towards the internal part of a corner, as a conventional motorcycle or bicycle do. Refer as example to FIG. 1, the front or rear view of a silhouette of such vehicle in upright position (continuous line) and leaning (dashed line).

This feature can be included in a vehicle of known type (see FIG. 2) using a tilting mechanism, usually made by a system of levers 1 which links the hubs 2, 3 of the right wheel with the left wheel, which allows the wheels of one side of the vehicle to move upwards referring to the vehicle and to the wheels of the other side to move downwards of the same amount.

Figure 2:
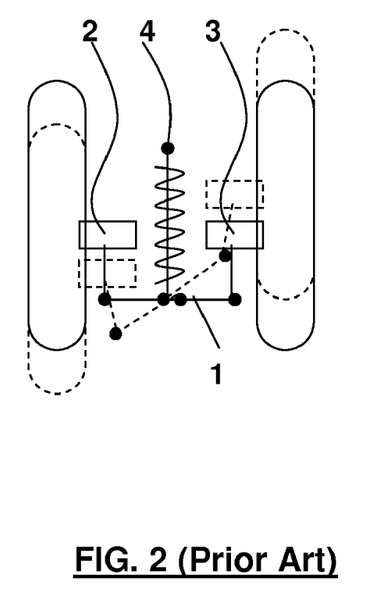

In the typical configuration this mechanism includes a shock absorber, for example installed in a central position 4, including a spring and a damper, to absorb ground irregularities and control the longitudinal load transfers of the whole vehicle.

Said link mechanism is mechanical in the usual form, with longitudinal or transverse arms, with various layouts already known in the field of automotive or motorcycle design.

One mechanism drives the vertical movement of the two wheels, a second one couples the right wheel to the left wheel in order to make the descending movement of one wheel corresponding to an equal ascending movement of the opposite wheel, a third mechanism links both wheels to the shock absorber, a fourth (in case of front wheels) allows steering to drive the vehicle.

It appears evident that all these mechanisms can be complicated, bulky, heavy, expensive and difficult to optimise.

During the drive on rough ground, it is possible that an oscillation provoked on one wheel on one side induces similar undampened oscillations on the other side, which can provoke a decrease of driving properties, both in terms of directional loss, and in extending braking spaces.

It is known from the patent application WO0244008-A2 a motorcycle with four wheels with a coupling system between left and right wheel made of leverage links between each wheel and a couple of central dampers with double piston. This system is particularly complex because it includes many mechanical components, many rotating, spherical and sliding couplings which are expensive, complicated to assembly, and may easily wear with use and time, and, in the end, make the vehicle unusable, or very expensive to maintain.

The simple mechanical coupling between left and right wheels can not dampen vibrations or oscillations that can arise when riding on rough terrain or the wheels start loosing grip (the "chattering", which can occur, for example, when braking very hard or cornering at high angular speed).

Other prior art systems to control the trim of motorcycles are known.

EP-1362779-A2 shows at one of both the couples of wheels of the motorcycle one or more dampers directly between said wheels of the couples, or between said systems of levers and a fixed point on the motorcycle chassis.

DE-9414724-U1 shows two hydraulic cylinders interconnected at the two ends through pipes. In the cylinders oil is present able to flow between them through the pipes. The pistons in the cylinders divide the chambers of the cylinders in two parts, not communicating, so that the oil movement in the two upper chambers corresponds to an opposite movement in the lower chambers.

WO-97/27071-A1 and WO-0244008-A2 show two hydraulic cylinders interconnected at the upper end through a pipe, with or without an accumulator connected to the pipe. The lower chambers below the pistons in the cylinders are empty and free to move according to the trim of the motorcycle.

The known systems are not completely free of drawbacks. For example when the leaning of the motorcycle is about to reach the grip limit of the tires, these known systems do not help limiting the negative effects of the increase of the leaning angle, or of an accidental fall.

SUMMARY OF THE INVENTION

Therefore the purpose of this invention is to indicate a system to control the trim of motorcycles with three or four wheels to avoid all said defects.

An object of this invention is a system to control the trim of motorcycles with three or four wheels, as described in the independent claim.

Particular embodiments are described in the dependent claims.

BRIEF DESCRIPTION OF THE DRAWINGS

Further goals and advantages of the present invention will be clear from the detailed description of an example and from the attached drawings, in which.

The same reference numbers and letters in the figures indicate the same components.

DESCRIPTION OF THE PREFERRED EMBODIMENT

According to a main aspect of the invention, the control of the trim of the vehicle is obtained by the insertion, at one or both wheel couples of the motorcycle, of one or more dampers, installed directly between the wheel oscillation mechanism, or one or both the swingarms, and a fixed point on the vehicle chassis, near the swingarm or the wheel.

Said dampers are tuned to damp unwelcome high frequency oscillations but not to interfere with the low speed oscillations due to the leaning of the vehicle during cornering (which could provoke a degradation of handling and ease of use of the vehicle), Indicatively, the damping effect should be low for complete oscillations in the frequencies lower than 0.5 Hz, higher for higher frequencies (approximately above the 2 Hz limit).

The damping unit can also be of adjustable type, to adapt the vehicle to the requirements of the driver and the road and terrain features.

In a possible variant of the system, a locking device can be added to stop the movement of the damper, thus stopping the tilting of the vehicle. This function is very useful, for example, when parking the vehicle, or when the vehicle is stopped. This mechanism can be made with a mechanical lock, for example a disc brake and a caliper if the link is mechanical, or a valve if the link is hydraulic.

Figure 3:
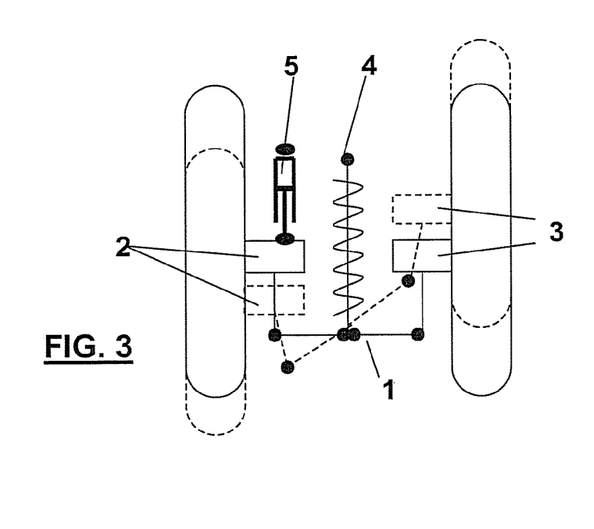
FIGS. 3, 4, 5, 6 show sketches of a motorcycle silhouette in front view with the system to control the trim in accordance with some possible variations of the present invention.
Figure 4:
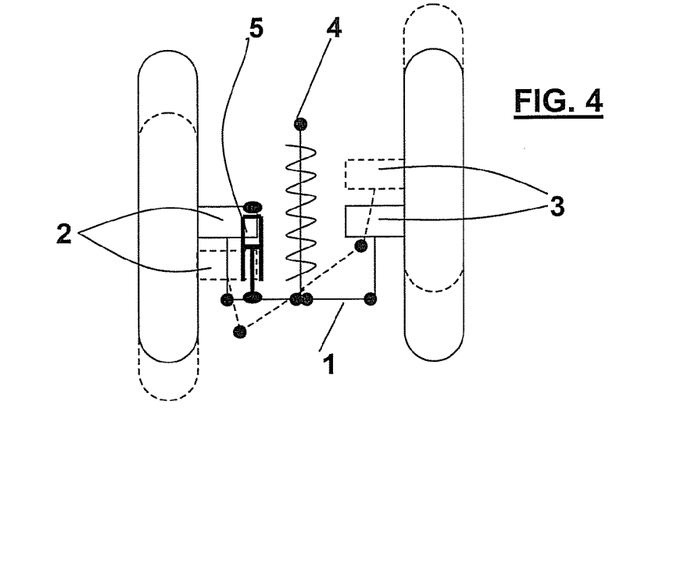
Figure 5:
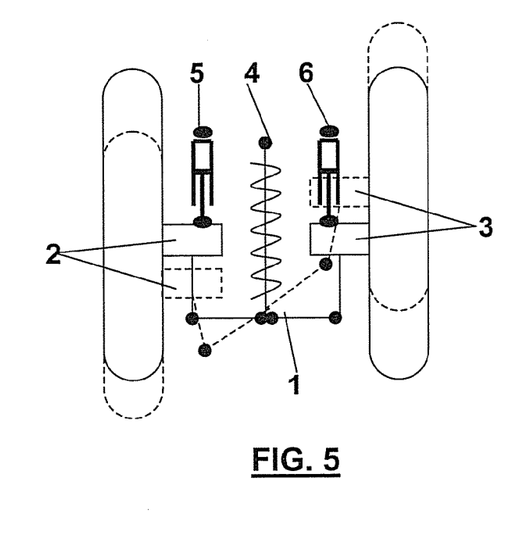

In FIGS. 3, 4, 5 different possible positions to install the damper are shown, not limitative to this mechanism layout.

For example, in FIG. 3 a damper 5 is installed directly between the hub of one of the coupled wheels (example the hub 2) and a fixed point on the chassis. In FIG. 4 two dampers, 5 and 6, are installed directly between the hubs of the two coupled wheels and two fixed points on the chassis. In FIG. 5 a damper 5 is installed between the linking mechanism 1 and one wheel hub 2, or between the linking mechanism and the vehicle chassis.

Figure 6:
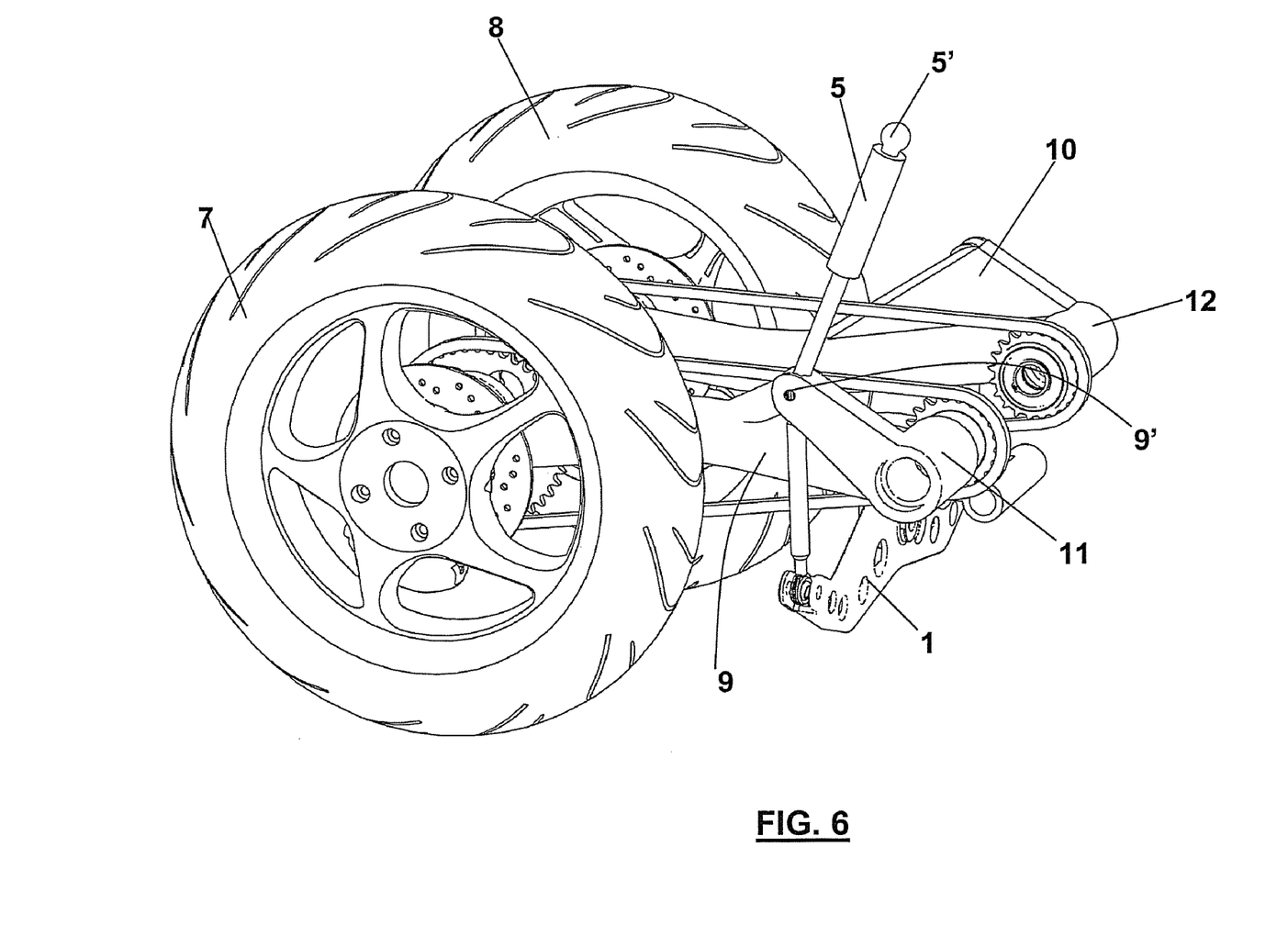

FIG. 6 shows an example of realization on a four wheel motorcycle in which a part is shown including a couple of wheels 7 and 8, and the respective swingarms 9 and 10 with their hinges to the chassis 11 and 12. It also shows the linking mechanism 1 connected according to FIGS. 1 and 2 layout.

A damper 5 is connected according to the invention between a point 9' of the swingarm 9 of the wheel 7 and the fixed point 5' on the chassis, not shown in the figure.

Damper 5 or 6 can be of known type, for example an oil or gas piston. According to another example of realization of this invention, the road roughness damping function can be attributed to the oscillation dampers 5 and 6, thus eliminating the damping function of the central shock absorber 4, which can be replaced by a simple spring.

Figure 7:
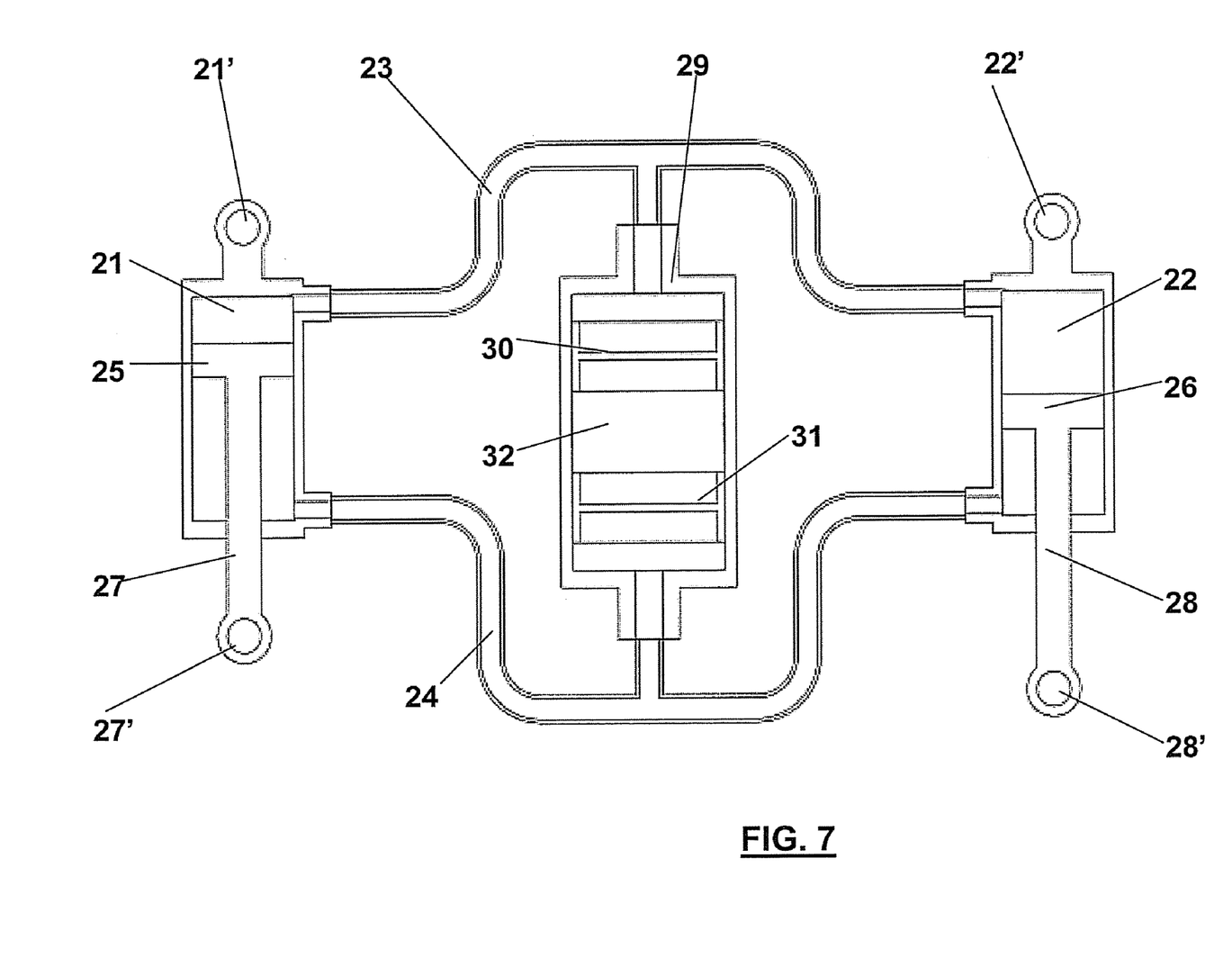
FIGS. 7, 8 and 9 show three variants of the device to control the trim of a motorcycle in accordance with the invention.

According to another example of realization of this invention, further evolution of the system involves a hydraulic connection of the two dampers to replace the mechanical linkage to lift and lower the opposite wheels with a hydraulic link. With reference to FIG. 7, the system comprises two hydraulic cylinders 21 and 22, connected with pipes 23 and 24. Inside the cylinders respective pistons 25 and 26 slide, moved by connecting rods 27 and 28. Inside the cylinders a fluid (usually, but not limitatively, oil), flows through the pipes. The pistons divide the cylinder chambers in two parts, not communicating, so that a fluid movement in the two upper chambers corresponds to an opposite movement in the lower chambers. The cylinders are linked to the vehicle chassis with a hinge 21' and 22', while the rods are linked to a respective wheel hub (or any element linked to it) by a hinge 27' and 28'.

When the vehicle leans, the pistons push the oil in the cylinder chamber to the opposite cylinder through the pipes, thus moving the two wheels connected to the rods in opposite directions An accumulator 29 can be present, with the end parts hydraulically connected to respective pipes 23 and 24. In the accumulator two floating pistons (or baffles, or septums) 30 and 31 are present which divide the internal chamber of the accumulator in three parts: the central part, isolated from the others, contains a gas in pressure, with the function of a spring. In case of rough ground that can provoke an abrupt movement of a single wheel, the fluid movement is partially absorbed by the accumulator, without flowing instantly to the other wheel causing its immediate movement.

In this case the central damper 4 can be replaced by the accumulators. The system is tuned to transmit the smooth movement caused by the leaning motion undamped, and damp the sudden oscillations caused by rough ground.

This can be achieved with a correct calibration of the oil passages, eventually with flow control valves and varying the preload pressure of the accumulator. It is also possible to trim the whole height of the vehicle increasing or decreasing the quantity of oil in the circuit.

Further possibility is to close the passage of oil from left to right (or vice versa) to lock the vehicle in an upright position (for example when parking).

Figure 8:
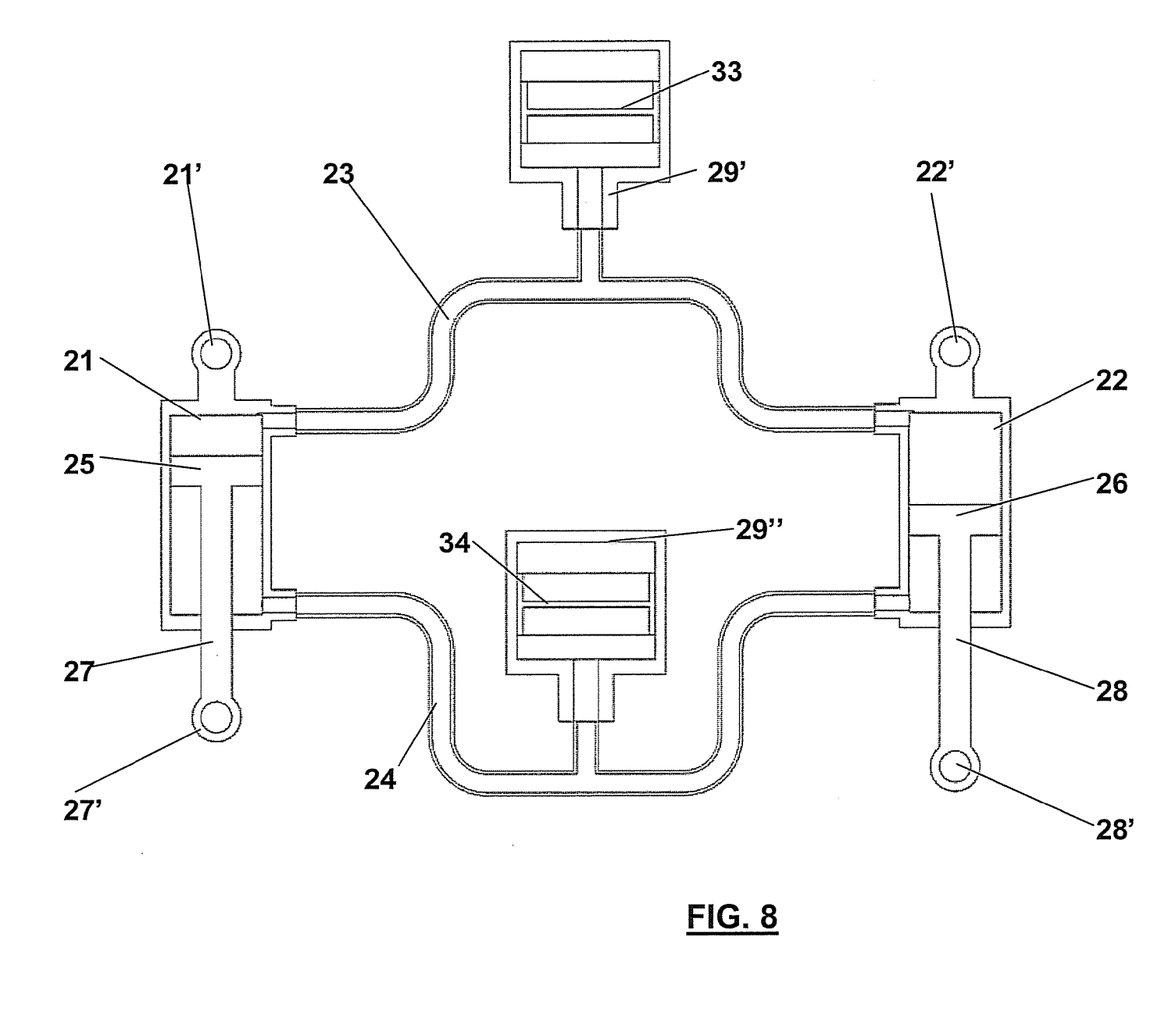

In a variant shown in FIG. 8, the accumulator 29 of FIG. 7 is divided in two separated accumulators 29 and 29', so as the central part of the chamber of FIG. 7 is divided in two parts, one per accumulator.

Figure 9:
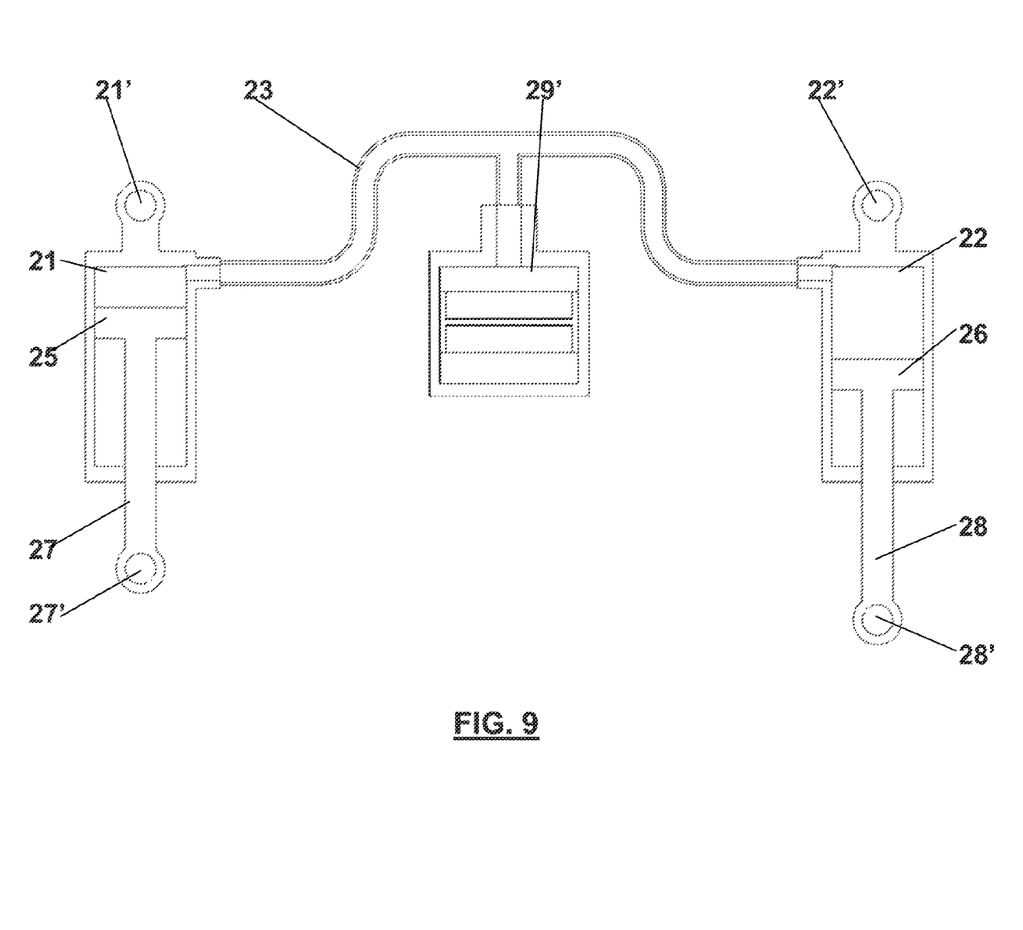

In another variant of the system, as shown in FIG. 9, it is possible to remove the "lower" part of the circuit shown in FIG. 7 (pipe 24 between the lower part of the cylinders 21 and 22), and replace it with gas in pressure, which fills the lower part of the cylinders. A single accumulator 29' is connected only to the upper pipe 23. This option maintains the circuit functionality introducing two very important features: when the leaning angle increases, the available space for the gas in one cylinder decreases, and its pressure increases, increasing the "resistance" of the system to further increase the leaning angle. This is very useful to help the rider to feel the angle at which the leaning starts to be dangerous because is reaching the grip limit of the tyres. Without this device, the pilot would go on increasing the leaning angle until the vehicle reaches some mechanical stop which abruptly impedes further leaning. This is not a very dangerous situation, but very unpleasant.

Another advantage is a partial "self righting" capability of the vehicle: in case of accidental fall, the vehicle lies at maximum lean on its side. The pressure gas helps the pilot to rise the vehicle in an upright position to restart the ride.

Figure 10:
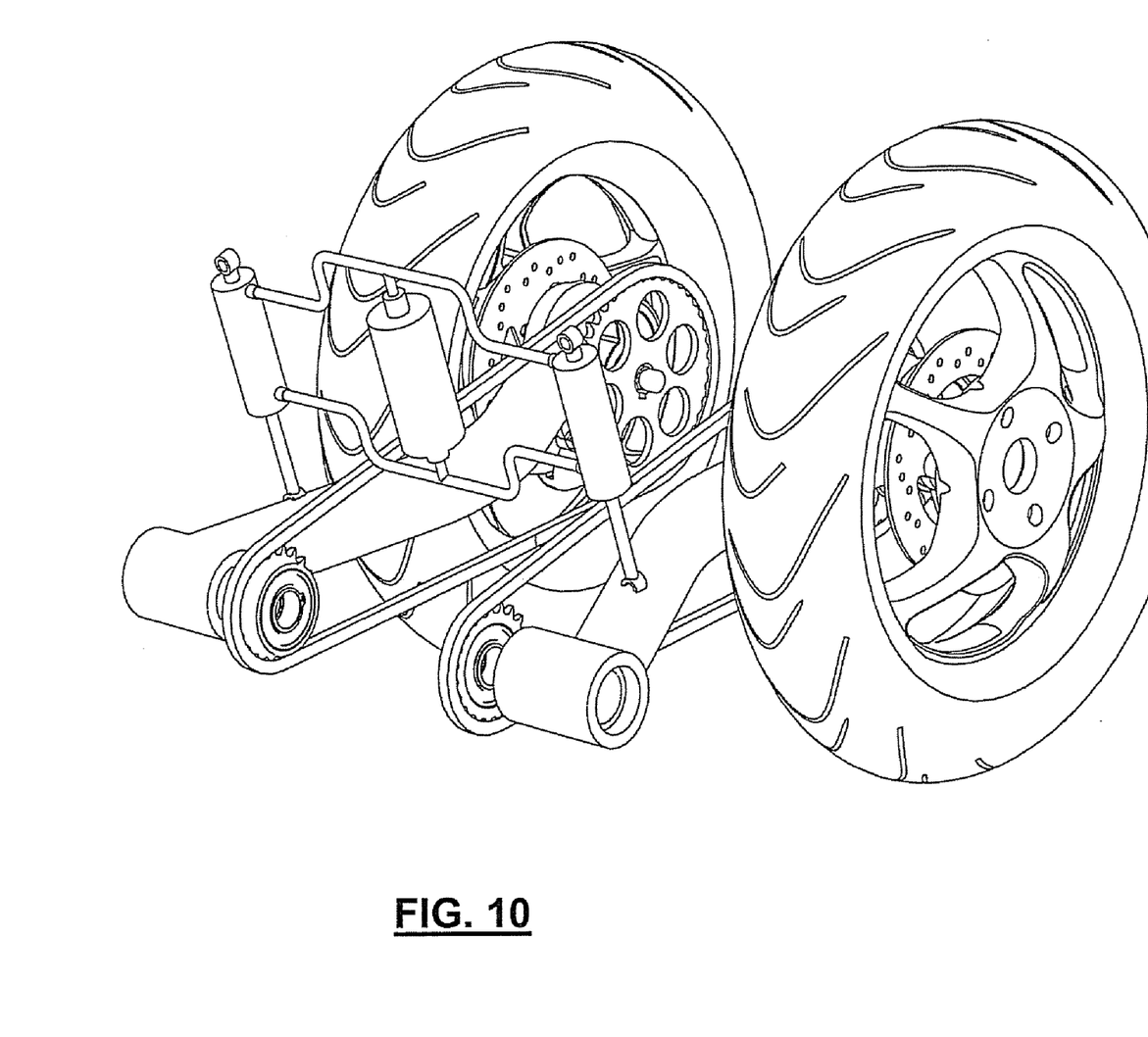
FIG. 10 shows a practical connection to a motorcycle of the variant device of FIG. 7.

FIG. 10 shows an example of application of the system shown in FIG. 7 on the rear suspension of a motorcycle type vehicle with four wheels, where the two accumulators are integrated in a single unit.

In a simplified variant of the system the accumulator can be removed, thus removing the possibility to control the height of the vehicle and its longitudinal trim (separately raising or lowering front or rear).

Further implementation details will not be described, as the man skilled in the art is able to carry out the invention starting from the teaching of the above description.

Many further changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

The invention claimed is:

1. System to control the trim of motorcycles with three or four wheels, said motorcycle having two couples of front and rear wheels, or one front wheel and a couple of rear wheels, or a couple of front wheels and one rear wheel, said system to control the trim comprises, at one or both couples of wheels, a hydraulic system configured to link hydraulically at least one couple of wheels, comprising two hydraulic cylinders interconnected at one of the ends through a first pipe, in each of said cylinders a piston sliding by means of a connecting rod, each piston dividing a chamber of the respective cylinder in two parts, not communicating with each other, in a first part of each cylinder communicating with said first pipe being present a liquid able to flow therebetween through said first pipe, and a second closed part of each cylinder having a gas under pressure therein, said cylinders and said connecting rods being bound to a chassis or to a hub by fastening, and wherein the system is configured to control the trim by an increase of leaning angle being resisted by an increase of the pressure of the gas present in the second closed one of the cylinders.

2. System to control the trim of motorcycles with three or four wheels as in claim 1, characterized in that it further comprises a first accumulator, an end of which being hydraulically connected to said first pipe.

3. System to control the trim of motorcycles with three or four wheels as in claim 1, characterized in that each hydraulic cylinder is connected between the hub of a wheel and a fixed point on the chassis.

4. System to control the trim of motorcycles with three or four wheels as in claim 1, characterized in that each hydraulic cylinder is connected between a swingarm of the wheel and a fixed point on the chassis.

* * * * *

UNITED STATES PATENT AND TRADEMARK OFFICE
CERTIFICATE OF CORRECTION

PATENT NO. : 8,286,978 B2  Page 1 of 1
APPLICATION NO. : 12/301020
DATED : October 16, 2012
INVENTOR(S) : Luciano Marabese It is certified that error appears in the above-identified patent and that said Letters Patent is hereby corrected as shown below:

Column 5, line 5, after the word "closed" please insert the following, -- part of --.

Signed and Sealed this
Twenty-sixth Day of February, 2013

Teresa Stanek Rea
*Acting Director of the United States Patent and Trademark Office*